United States Patent [19]

Ekman

[11] 4,289,164
[45] Sep. 15, 1981

[54] COUPLING DEVICE

[75] Inventor: Kjell R. Ekman, Zug, Switzerland

[73] Assignee: Ekman Engineering AG, Zug, Switzerland

[21] Appl. No.: 141,734

[22] Filed: Apr. 18, 1980

Related U.S. Application Data

[63] Continuation-in-part of Ser. No. 884,668, Mar. 8, 1978, Pat. No. 4,219,048, which is a continuation-in-part of Ser. No. 691,105, May 28, 1976, abandoned.

[51] Int. Cl.³ ............................................. F16L 37/28
[52] U.S. Cl. ................................................ 137/614.03
[58] Field of Search ........................ 137/614.03, 614.04

[56] References Cited

U.S. PATENT DOCUMENTS

| | | | |
|---|---|---|---|
| 2,254,997 | 9/1941 | Fisher | 137/614.03 |
| 2,304,390 | 12/1942 | Wolfram | 137/614.03 |
| 2,457,251 | 12/1948 | Main | 137/614.03 X |
| 2,821,412 | 1/1958 | Frye | 137/614.03 |
| 3,039,794 | 6/1962 | DeCenzo | 137/614.03 |
| 3,117,592 | 1/1964 | Abbey | 137/614.03 |
| 3,224,728 | 12/1965 | Buseth | 137/614.03 X |
| 3,285,283 | 11/1966 | Calvin | 137/614.03 |
| 3,417,781 | 12/1968 | Gregg | 137/614.04 |
| 3,450,424 | 6/1969 | Calisher | 137/614.03 X |
| 4,086,939 | 5/1978 | Wilcox | 137/614.03 |

FOREIGN PATENT DOCUMENTS 1015631  8/1952  France ........................ 137/614.03

*Primary Examiner*—Robert G. Nilson
*Attorney, Agent, or Firm*—Pollock, Vande Sande & Priddy

[57] ABSTRACT

A coupling device has two connectable and disconnectable coupling parts. A first of said coupling parts is provided with a centrally arranged body and an inner casing slidingly arranged between two positions relative to the central body. In a first or disconnected position, the inner casing cooperates with the central body to keep closed a passage for a fluid medium through the first coupling part. A second of said coupling parts has a front section interactable with the inner casing in order to force the inner casing to a second position against the force of a spring which urges the casing towards the body. In the second or connected position of the inner casing, the passage for the fluid medium is opened.

21 Claims, 9 Drawing Figures

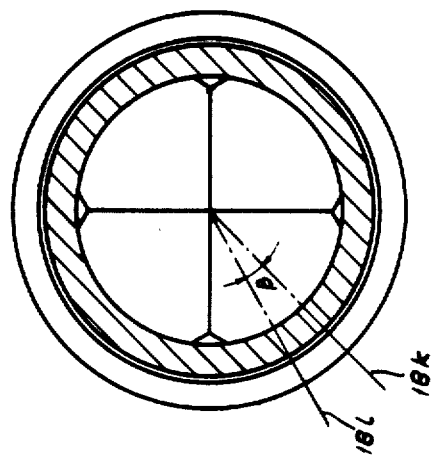
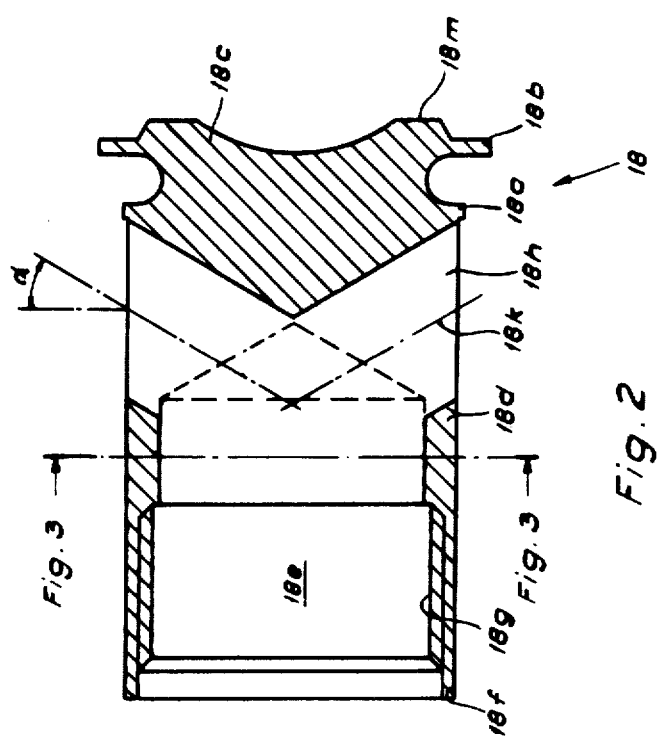

4,289,164

COUPLING DEVICE

CROSS REFERENCE TO RELATED APPLICATION

This application is a continuation-in-part of applicant's pending U.S. patent application Ser. No. 884,668 filed Mar. 8, 1978 and issued as U.S. Pat. No. 4,219,048 on Aug. 26, 1980, which is, itself, a continuation-in-part of applicant's U.S. patent application Ser. No. 691,105 filed May 28, 1976 and now abandoned. It is respectfully requested that the subject matter of these applications be incorporated into the present application by reference thereto.

FIELD OF THE INVENTION

The present invention relates to a coupling device for supplying fluid from a pressurized source to an output conduit without fluid leakage and comprises two detachable connectable coupling parts, wherein the coupling device is especially suitable in quick-coupling devices when a system under pressure is to be quickly connected or disconnected. The system may consist of a fluid delivery system to which fluid-receiving equipment is to be connected. The equipment may consist of working machines, working tools or the equivalent.

In the system and the connected equipment, pressure shocks of up to 300 kilopond/cm$^2$ (30 MPa) may appear, with the coupling device of the present invention functioning to permit the fluid to flow in both directions through the coupling device. The first coupling part may be attached to the system, with the second coupling part attached to the fluid-receiving equipment. Of course, the arrangement of the first and second coupling parts may be reversed as desired.

OBJECTS OF THE PRESENT INVENTION

In the kinds of coupling devices providing for a quickly detachable connection, there is a pronounced desire to perform the connection and disconnection of the mentioned equipment to and from the system without any leakage of the fluid. The demands are, to a great extent, determined by environmental aspects which do not tolerate leakage of a fluid in the form of hydraulic fluid, gas, etc. Even if a coupling device creates only small amounts of leakage at the time of connection and disconnection to and from the system, a great number of such connections and disconnections can cause a considerable amount of leakage out of the system, which in the case with hydraulic oil as the fluid medium, creates unacceptable pollution problems.

The present invention is designed especially with considerations to these problems in mind and presents a coupling device with a completely leakage-proof connection and disconnection structure arranged between systems and equipment of the mentioned kind.

A further object of the present invention is to make possible an even and effective fluid flow through the various parts forming the coupling device without the coupling device disturbing said fluid flow, which is important in quick-coupling devices used in connection with measuring apparatus for high accuracy measuring of static and dynamic pressures, vacuum, etc.

Another object of the present invention is to provide a simple structure of the coupling parts having cheap components for simplified manufacturing.

A yet further object of the present invention is to provide a coupling device in which connection of the coupling parts can be performed by a one-hand-grip.

SUMMARY OF THE INVENTION

In the preferred embodiment of the present invention, a coupling device is provided for supplying a fluid medium from a pressurized source to an output conduit without fluid leakage. The coupling device includes first and second coupling parts each having a flow passageway extending therethrough. The first and second coupling parts each have on a respective first end thereof means to permit detachable coupling of said parts with their respective axial flow passageways aligned to permit fluid flow through said coupling device.

A valve body including a hollow portion is fixedly supported within the first coupling part and includes at least one aperture extending completely therethrough. The second coupling part includes a valve body having an enlarged end portion confronting the hollow valve body positioned within the first coupling part. Resilient biasing means are mounted within the coupling device for biasing the confronting valve bodies into contact with one another.

A hollow casing is slidably mounted within the first coupling part and is spring biased into a first position wherein an end portion of the hollow casing abuts a planar surface portion of the valve body positioned within the first coupling part. Simultaneously, the hollow casing closes the flow passageway through the first coupling part.

The valve body positioned in the first coupling part is formed with a groove or recess confronting the slidable hollow casing, wherein a sealing ring is positionable within a space formed by the groove and a confronting portion of the slidable casing. An annular and bendable protuberance formed in the valve body adjacent the groove or recess is deformable into biasing contact with the sealing ring for biasing the sealing ring into fluid-tight engagement with the groove and slidable hollow casing.

A second slidable hollow casing is also positioned within the first coupling part and is arranged to selectively engage the first hollow casing as the first and second coupling parts are moved toward their coupled relationship, whereby the second hollow casing presses the first hollow casing out of contact with the planar end portion of the valve body, allowing fluid to flow through the coupling device.

BRIEF DESCRIPTION OF THE DRAWINGS

The present invention is illustrated in the accompanying drawings, wherein:

FIG. 2 is a section in the axial direction of a valve adaptable for use in the coupling device shown in FIG. 1;

FIG. 3 is a cross-section of the valve shown in FIG. 2;

DESCRIPTION OF THE PREFERRED EMBODIMENTS

Figure 1:
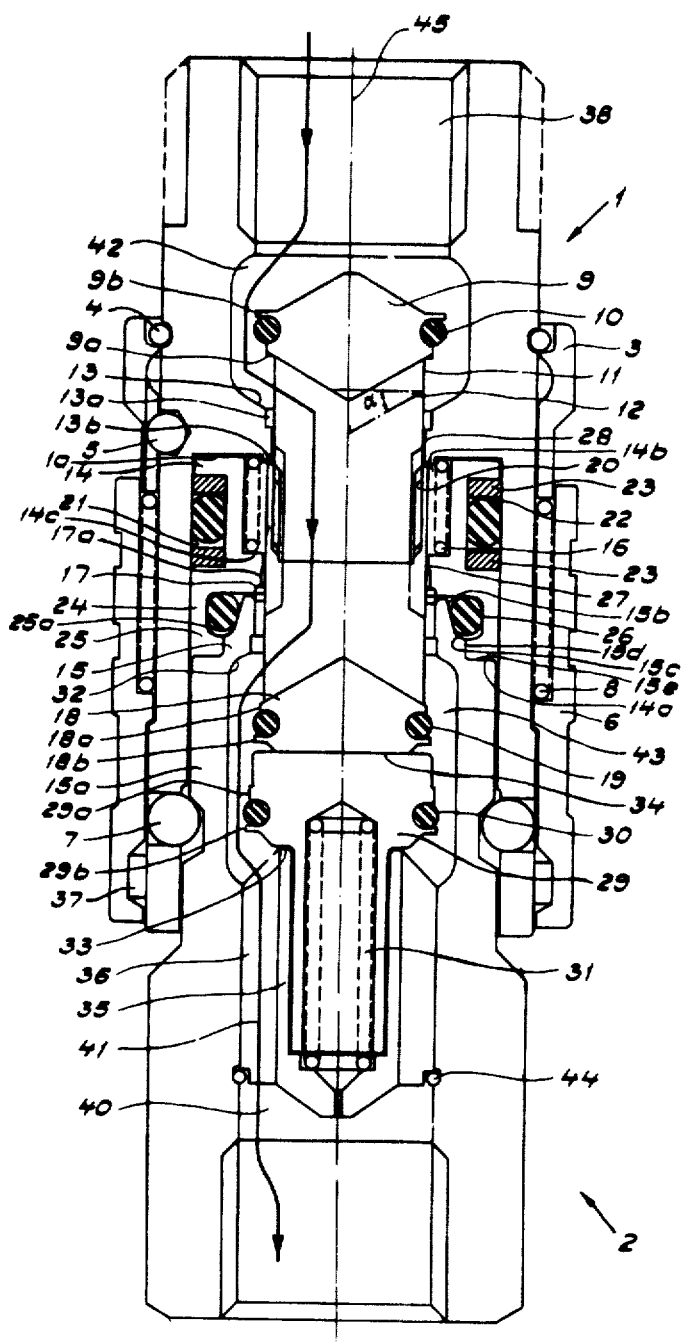
FIG. 1 is a section in the axial direction through the coupling parts forming the coupling device, with the coupling parts being shown in their connected position.

In FIG. 1 a first coupling part forming part of the coupling device is designated 1, whereas a second coupling part detachably connectable to the first coupling part is designated 2. Attached to the first coupling part is a locking assembly which is intended to lock the coupling parts to each other in the connected position, thereby preventing unintentional disconnection of the coupling device. The locking assembly includes a first stop casing 3 which is positioned for sliding movement relative to the first coupling part between end positions determined by a locking ring 4 and locking ball 5, for which the stop casing 3 has an inner axial groove, allowing casing 3 to be slid on the first coupling part. Casing 3 further includes a peripherally arranged, ring-shaped inner groove allowing the casing to be turned to a stop position (not shown in FIG. 1) in a specific axial position determined by the position of the locking balls.

The locking assembly also includes a second stop casing 6 which is positioned for sliding movement in the axial direction of the first coupling part and which interacts with locking balls 7 that interact, in turn, with coupling part 2 via grooves formed in surface portions of the latter. Between the first and the second stop casings, a helical spring 8 is positioned to axially separate the casings from each other. The locking assembly is considered to be conventional in design and self explanatory in operation. A detailed explanation of the operation of the locking assembly has not been included, and surfice it to note that locking balls 7 engage surface portions of casing 6, coupling part 2 and coupling part 1 to prevent axial separation of the coupling parts.

The first coupling part 1 includes a first valve 9 extending in the longitudinal direction of the first coupling part, said first valve 9 being slidingly designed with an enlarged sealing section or portion containing a sealing ring 10, and a narrowed section 11 having a substantially tubular configuration. The tube has through side holes 12 located adjacent the enlarged section or portion of the valve 9. The side holes in the preferred embodiment, are four in number, with the side holes including obliquely-shaped walls, whereby the axis for each side hole is inclined by an angle α relative to a line extending perpendicular to the symmetrical axis of coupling parts 1 and 2. The angle α is chosen between 15° and 65°, and has a preferable valve of 30° for creating an optimal fluid flow through coupling part 1.

The enlarged section or portion of valve 9 has both a shoulder 9a, and a flange-shaped proturberance 9b, the latter to be folded over the sealing ring 10 which fixes the position of sealing ring 10 on the valve. The proturberance 9b is shown in the un-folded position. The first coupling part 1 also includes a first valve seat portion 13, against which the first valve 9 and its sealing ring 10 rests in the disconnected position of the coupling parts 1 and 2. The seat portion 13 is designed with a shoulder 13a, creating a mechanical stop or "sink limitation" for the valve 9. In the disconnected position, it is assumed that a fluid works against the enlarged section of the first valve 9, causing said valve to be pressed against the first seat portion 13, thereby closing the outgoing passage for fluid flow through the system. The passageway is connected to the first coupling part through tubing or other connecting pipe.

Located adjacent to the first seat portion 13 is an inner casing 14 which encloses the narrowed section of the first valve 9 and is capable of sliding movement between first and second axial positions relative to the position of the first seat portion 13 and the first valve 9.

Movement of inner casing 14 (between a fully connected position shown in FIG. 1 and identified as the second position, and a disconnected or first position) is actuated by means of a front section or part 15 of the second coupling part. A first helical spring 16 biases inner casing 14 to the disconnected or first position. In this position, the casing 14 is positioned substantially opposite the locking balls 7 of the locking assembly.

The inner casing 14 is designed with a second valve seat portion 17 for a second valve 18, which, like the first valve, is designed with an enlarged section or portion having a sealing ring 19, and a narrowed tubular section having additional side holes formed in said tube arranged adjacent the enlarged portion of the second valve 18. The second valve 18 has on its enlarged portion a shoulder 18a and a foldable flange-shaped protuberance 18b of equivalent function to the shoulder 9a and the flange-shaped protuberance 9b of the first valve 9. The side holes arranged adjacent the second valve 18 are equivalent in kind and number to the corresponding holes 12 formed adjacent the first valve 9. The inner casing 14 has a cavitation 17a with a bottom surface which provides a mechanical stop or so called "sink limitation" for the mutual movements of the casing 14 and the second valve 18. The second valve 18 is mechanically connected to the first valve 9 by means of threads formed on the ends of the narrowed parts of the first and second valves. The narrowed tube-formed part of the first valve 9 is equipped with an outer thread 20 interactable with an inner thread of the narrowed tube-formed part of the second valve 18. Due to the mechanical connection, the movement of the second valve 18 is coordinated with the movement of the first valve 9. The resulting protuding end edge of the narrowed section of the second valve 18 forms a stopping edge which is interactable with a blocking edge 13b of the seat portion 13. The interaction between the stopping edge and the blocking edge 13b produces a limit to the displacement of the first and second valves 9 and 18 in one direction. This limit defines a first axial displacement position (shown in FIG. 1) for the first and second valves with the valves also having a second axial displacement position. As will become clear, the first axial displacement positions corresponds to the first and second coupling parts being connected while the second axial displacement position corresponds to the coupling parts being disconnected.

FIGS. 2 and 3 show the second valve 18 in a more detailed form. In FIG. 2, the inner thread on the second part is designated 18g, and the protruding edge 18f. The foldable flange on the enlarged sealing section 18c is designated 18b, while the flange or shoulder in the "sink-limitation-device" is designated 18a. Four holes 18h in the side wall 18d are positioned with the axis 18k of each hole 18h inclining at the angle α in relation to a cross-section plane extending perpendicular to the paper plane of FIG. 2. In the section of FIG. 3, the axis 18k extends radially with respect to an axial line extending through said valve 18. However, holes 18h may be inclined with respect to axis 18k by forming holes 18h which follow a line 18i that is inclined at an angle β relative to axis 18k. The main fluid flow passage formed through the coupling device passes through the space 18e inside the second valve 18. In the parts of the narrowed section located adjacent the outlets (inlets) of the holes, the valve 18 has a spherical configuration making even fluid flow possible.

In the disconnected displacement position of the coupling parts 1 and 2, the second seat portion 17 of casing 14 is pressed against the sealing ring 19 of the enlarged section of the second valve 18 by the action of biasing spring 16.

Inner casing 14 is guided by an inner guiding surface or wall 21 of coupling part 1, which wall acts as a holder for a sealing device 22' and provides a sealing relationship between an outer side of casing 14 and the guiding surface 21 of coupling part 1.

The sealing device 22 consists of a sealing ring 22 positioned between support packing rings 23 of Acetal, Teflon, etc. The sealing ring 22 has a standard O-sealing-ring configuration formed of Nitril, Viton, etc. As an alternative, a conventional sealing of the piston packing type may be used. Inner casing 14 is equipped with a prolonged outer edge or end section 24 arranged at an end which interacts with the second coupling part 2. At its outer end, edge 24 has an inwardly directed flange 25 positioned to form a space for a sealing ring 26. Members 24 and 25 may be described as two angled portions; the first angled portion 24 and the second angled portion 25. Furthermore, the casing has a guiding surface 27 for the narrowed section of the second valve 18 with a corresponding guiding surface 28 positioned on the first valve seat portion 13 of the narrowed section of the first valve 9. Inner casing 14 also has an inner recess 14b directed towards the common axis 45 of the first and second coupling parts 1 and 2. The spring 16 is positioned between an end wall 14c of the recess 14b and an end wall 1a of the unit 1. Inner casing 14 is also provided with a corresponding recess on the outer side for retaining the sealing device 22, 23.

The second coupling part 2 is equipped with a front section (nipple) 15a shaped in the form of a casing, and a valve, hereafter called the third valve 29, being designed with both an enlarged section with a sealing ring 30, and a narrowed section. The third valve is actuated by a second spring 31, which urges the third valve to a position wherein it bears against a third seat portion 32, located at the inner surface of the casing-formed outer section 15a. Also, the third valve 29 has a shoulder 29a and a flange-shape protuberance 29b to be folded thereover, wherein each part functions in an equivalent manner to the coupling parts of the first and second valves 9, 18. In the fully connected position of the coupling parts 1 and 2, the third valve 29 is in a position wherein the lower part of the enlarged section of the third valve 29 bears against a stopping surface 33 within the second coupling part. The enlarged section of the third valve 29 has a smooth end surface 34 interactable with a corresponding smooth end or contact surface 18m of the enlarged section of the second valve 18. The contact surfaces are ring-shaped as shown in FIG. 2. The front section 15a forms a casing while the third valve 29 of the second coupling part 2 is designed such that when the second coupling part 2 is unactuated, the end surface of the third valve is in flush contact with the seat 32 formed in the front section 15a.

The front portion 15, which is formed as a casing of the second coupling part has an inwardly bent section which, in the connected position of the coupling parts 1 and 2, is essentially parallel with the first angled portion 24 of the casing 14, and which through a slanting sealing surface 15b of its outer side interacts with the sealing ring 26. The sealing surface 15b is elongated and ends in its lower parts having a distinct shoulder 15d. The end surface of the inwardly bent section is interactable with a transversely opposite surface of inner casing 14. On the front section 15a of the second coupling part is arranged a transverse shoulder 15e interactable with an opposite, transverse surface 14a of said casing 14 positioned on the outer side of the inwardly folded second portion 25. Thus, the first portion 24 of the casing 14 and the inwardly bent section of the front part of the second coupling part are the same length. The second portion 25 has an inner surface 25a positioned opposite the distinct shoulder 15c when the coupling parts 1 and 2 are in the connected position. The distinct shoulder and inner surface form a bottom for the sealing ring 26. The second portion 25, or its inner surface 25a, then extends only along a part of the cross-section of the sealing ring. The second portion and shoulder extend along 15%–90% of the cross-section, preferably 40%–60%, and in the shown embodiment 50%. The front section also has a further surface 15d located adjacent the sealing surface and distinct shoulder. The free end of the second portion 25 is adjacent to said further surface in order to form a small space between the front section of the second coupling part and the inner casing 14. Because of the structure of the slanting surface 15b, the distinct shoulder 15c and the second portion 25 of the casing the space is in communication with the sealing ring 26, which guarantees an effective sealing function.

The second coupling part 2 has a centering device 35 for the narrowed section of the third valve 29. The centering device 35 comprises a hub section and spoke formed parts 36 that are positioned in the longitudinal direction of the second coupling part; whereby the fluid to be transmitted may pass in the longitudinal direction through the second coupling part.

In the disconnected position of the coupling parts 1 and 2, the first valve 9, according to the above, is actuated against the first seat portion 13 by the pressure of the fluid to be transmitted. The casing 14 is brought to its first position by the first spring 16. In this position, the seat portion 17 of the casing 14 bears against the sealing ring 19 of the second valve 18. The casing 14 is positioned opposite to the locking balls 7; thereby the stop casing 6 is kept in a blocking position by the locking balls 7, wherein the latter interacts with the groove 37 in the stop casing 6. This feature facilitates the connection of the coupling parts 1 and 2 of the coupling device. In the second coupling part, the third valve 29 is actuated by a second spring 31 to interact with the third seat portion 32. Thus, the position of the valves blocks the fluid pressure via the incoming passage 38, from being efficiently transmitted past the first and second valves, with the casing 14 sealing the through side holes of the narrowed section of the second valve 18. The outgoing passage 40 of the second coupling part 2 is sealed by means of the third valve 29. The springs 16 and 31 are chosen so as to achieve a proper seal against the prevailing pressure present when the coupling parts are in the disconnected position.

In the above described embodiment, the first spring 16 consists of a helical spring of 15.0 mm diameter, the wire 1.3 mm and length in unactuated condition 35.0 mm. Corresponding dimensions of the second spring 31, which is also designed as a helical spring are; diameter 5 mm, wire diameter 1.0 mm, and length in unactuated condition 30 mm. The springs are constructed of conventional spring material. The sealing rings referred to may be made of Nitril, Viton, etc. The coupling device has a total length of about 90 mm and the diameter of the first coupling part is about 30 mm. The shown coupling is intended to achieve a leak-proof detachable connection for a system under pressure. The connection and disconnection itself are performed according to the above at low pressure, even if the pressure of the system and the connected equipment momentarily may reach 300 kilopond/cm² (30 MPa). By adding a known pressure eliminator (not shown) the present coupling device may simply be positioned for connection even in cases of high pressures.

Due to the design of the above described parts, the assembly of the coupling device itself is simple and economical. As to the assembly of the first coupling part 1, the first spring 16 and the casing 14 are first brought into position in the ring formed cavitation in the first coupling part. After that, the valve 9 is brought in from one end of the coupling part while the valve 18 is brought from the other end of the coupling part, with the mentioned valves being screwed together. During assembly of the second coupling part, the valve is brought in via that end of the second coupling part which is opposite from the first coupling part, and after that, the centering parts 35, 36 are brought into the second coupling part via the same end and locked by a locking ring 44.

FUNCTION OF THE PREFERRED EMBODIMENT

The operation of the valves following connection of coupling parts 1 and 2 depends on the pressure conditions at the connections 38 and 40. Assuming that the pressure is highest at connection 38, the second and third valves will be opened first, and the first valve 9 last; this order being due to the interaction between inner casing 14 and the front section 15 of the second coupling part, and the contact between the second and third valves via their smooth end surfaces. If the pressure is higher at the connection 40 than at 38, the first valve 9 will be opened first and after that the third and second valves 18 and 29, respectively.

Due to the design of the front section 15a of the second coupling part 2, and the design and location of the sealing ring 26, a safe seal is achieved before any of the three valves are actuated from their sealing positions; this being important for establishment of a leak-proof connection.

Following the opening of all the valves, a through passage is created which, in the case when the pressure at connection 38 is higher than that at 40, runs as is shown by the continuous arrow 41. If the pressure is higher at 40, the arrow will face the opposite direction. The passage, according to the arrow 41, runs through space 42 at the side of the broad section of the first valve, through the side holes 12 of the narrowed section of the first valve, within the narrow section, through the narrow section of the second valve, through the side holes in the narrow section of the second valve, through a space 43 at the side of the enlarged sections of the second and third valves, and finally between the spoke-formed parts 36 in the second coupling part. None of the fluid can leak during the connection of the coupling due to first valve 9 being lifted last from its seat, with a leak-proof being made by means of the sealing rings 22 and 26.

During disconnection of the coupling parts 1 and 2, the second valve 18 is first actuated against its seat 17 of the casing 14; after which the third valve is closed against the seat 32. Finally, the first valve 9 moves toward its seat part 13. The disconnection from the fully connected position is preceded by manual actuations on the stop casings 3 and 6, during which, an axial displacement of the stop casing 6 takes place, with the groove 37 in said stop casing 6 being positioned opposite to the locking balls 7, which then can be pressed out into the groove to provide manual disconnection of the coupling parts. It is observed that if, in the connected position of the coupling parts 1 and 2, the pressure of the system is high (for instance up to 300 kilopond/cm² or 30 MPa), there will be no separation of the coupling parts because of the force which presses the locking balls 7 against both the smooth surface of the stop casing 6 and the slanting front wall of the groove of the coupling part 2. The force prevents a longitudinal displacement of the stop casing 6. Thus, the quick-connect coupling allows disconnection at only low pressures, when forces on the locking balls can be overcome by manual power on the stop casing 6. In the case of a high pressure, a reduction of the pressure in the system must first take place, as by means of a cut-off valve or similar. Due to the fact that the second and third valves 18, 29 interact by their smooth end surfaces, oil leakage is eliminated with the shown construction.

The interaction between the shoulder 13b of the first seat portion and the protruding end surface of the narrowed section of the second valve 18 results in the required flow areas being achieved simultaneous with the completion of the movements of the second valve 18 in one direction.

Figure 4A:
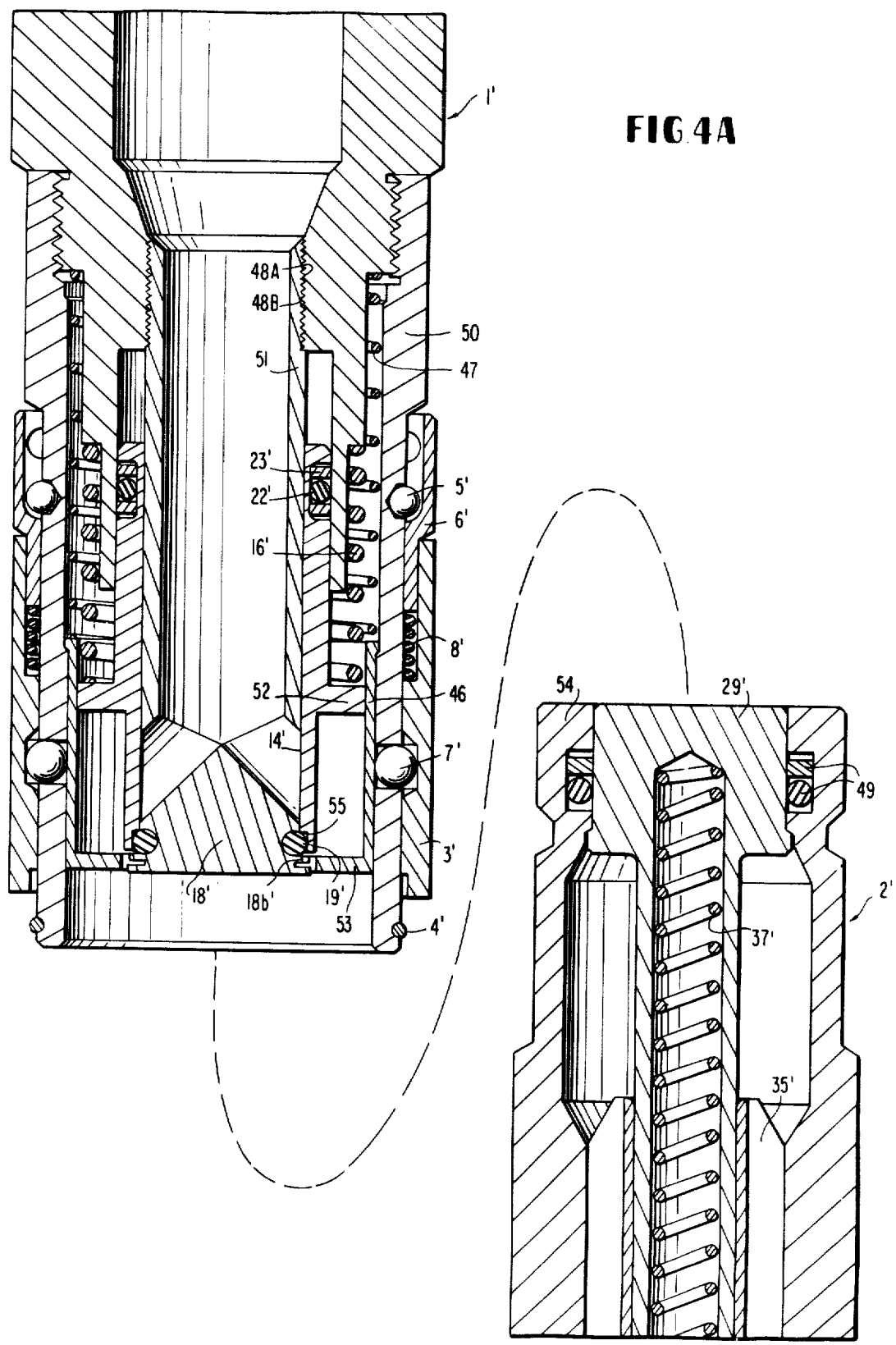
FIG. 4A is a cross-section taken in an axial direction through the coupling parts of a further preferred embodiment, wherein the coupling parts are in the disengaged position.
Figure 4B:
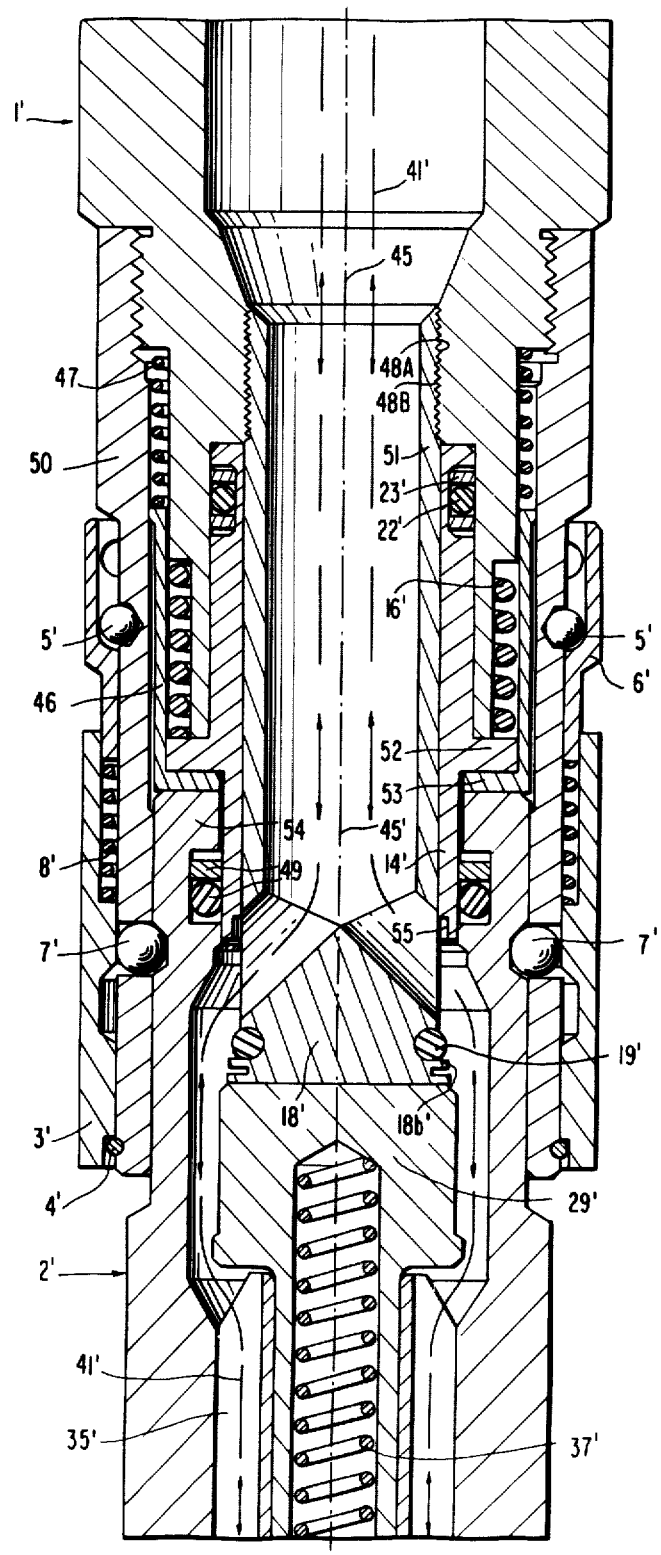
FIG. 4B is a view of the embodiment of FIG. 4A with the coupling parts in the engaged position.

A further preferred embodiment of the present invention is shown in FIGS. 4A and 4B, wherein elements similar to elements in the preceeding embodiments have been given similar numerals with the addition of a prime (') designation.

A fluid coupling is comprised of first and second hollow coupling parts designated 1' and 2', respectively. A hollow casing 50 surrounds and is attached to an end portion of coupling 1'. Casing 50 slidably supports a pair of hollow stop casings 3' and 6' with locking ring 4' limiting the axial movement of casing 3'. Locking balls 5' and 7' selectively prevent sliding movement between casings 50, 3' and 6' which effectively lock coupling parts 1' and 2' into a connected position against unintentional disconnection. A helical spring 8' biasingly retains casing 3' in the locked position in a manner similar to the preceeding embodiments.

First coupling part 1' is cylindrically shaped and includes a plurality of threads 48A formed in an interior surface portion thereof. A valve assembly 18' includes an elongated, cylindrically shaped hollow end portion 51 insertable into cylindrically shaped coupling part 1'. Hollow end portion 51 includes threads 48B formed on an outer surface thereof, which fixedly engage with threads 48A of coupling part 1'.

A hollow, inner casing 14' is slidably positioned between the end portion 51 of valve 18' and a cylindrically shaped end portion of coupling part 1'. A sealing device, including a sealing ring 22' and packing rings 23', is supported in a groove formed in casing 14' and provides a fluid seal between casing 14' and coupling part 1'.

Casing 14' further includes an integral hub portion 52 extending in the direction of casing 50. When coupling parts 1' and 2' are in the connected position, a side wall portion of hub 52 abuts the cylindrically-shaped end of coupling part 1', while a biasing spring 16' is compressed between hub 52 and coupling part 1'. Spring 16' attempts to force hub 52 and casing 14' out of engagement with coupling part 1'.

A further, hollow casing 46 is slidably positioned between coupling part 1' and casing 50, with a portion of casing 46 being supported by hub 52. Casing 46 includes an elongated end portion 53 extending in the direction of valve 18'. A biasing spring 47 is compressed between casing 46 and a wall portion of coupling part 1', with spring 47 attempting to force hub portion 53 of casing 46 out of abutting contact with hub 52 of casing 14'.

Hollow, cylindrically shaped coupling part 2' includes a flat end portion 54 which is pressed into abutment with end portion 53 as coupling part 2' is slidably inserted between casing 50 and valve 18'. Further pressure on coupling part 2' forces end portion 53 into abutment with hub 52 and moves both casings toward coupling part 1', while compressing biasing springs 16' and 46, respectively, until end portion 54 has forced hub 52 and casing 14' into abutting contact with an interior wall surface of coupling part 1'.

Coupling part 2' further includes a circumferentially extending groove formed on an inner surface thereof, which supports a sealing assembly 49 comprised of a sealing ring and associated packing ring. As end portion 54 of coupling part 2' slides along casing 14', sealing assembly 49 forms a fluid tight connection between casing 14' and coupling part 2'.

A passageway extends through hollow portion 51 and joins with a plurality of oblique holes extending through the wall surface of valve 18' to form a fluid passage through valve 18'. Valve assembly 18' further includes a solid end portion adjacent the through holes and a circumferentially extending groove formed in an outer surface thereof, with a sealing ring 19' positioned within the groove. A foldable, circumferentially extending flange 18b' is positioned adjacent to and deforms into contact with sealing ring 19' to provide structural support for the ring 19'.

A further valve assembly 29' includes an end portion abutting an end portion of valve 18'. Valve 29' is formed as an elongated body including splines 35' engaging similar splines formed on coupling part 2'. A fluid passageway is indicated by arrow 41' and extends between valve 29' and an inner surface of coupling part 2' and between splines 35'.

The operation of the further embodiment of FIGS. 4A and 4B will now be discussed in detail.

When the fluid coupling is in the disengaged condition as shown in FIG. 4A, coupling part 2 is withdrawn from contact with end portion 53. Biasing spring 47 expands and forces casing 46 to move until end portion 53 is positioned approximately adjacent to the end of casing 50, while biasing spring 16' simultaneously expands and forces casing 14' to slide relative to cylindrical portion 51 until a recessed end portion 55 of casing 14' abuts sealing ring 19' forming a fluid-tight seal therebetween.

When it is desired to interconnect coupling parts 1' and 2', end portion 54 of coupling part 2' is inserted into casing 50. End portion 54 first abuts end portion 53, forcing casing 46 to compress spring 47.

Further movement of end portion 54 brings end portion 53 into contact with hub 52. It is very important to note that before hub 52 is moved, a fluid seal is established between coupling part 2' and casing 14' via sealing assembly 49. This prevents any fluid from accidentally leaking out of the coupling device during the connection procedure.

As end portion 54 continues to move in the direction of coupling part 1', end portion 53 and hub 52 are forced to move in the same direction. Movement of hub 52 and attached casing 14' opens the fluid passageway through valve 18', as shown in FIG. 4B. End portion 54 of coupling part 2' continues to move until casing 14' abuts coupling part 1,' allowing the locking balls 6' and 7' to assume the locked position.

This embodiment differs from the preceeding embodiment primarily in that valve assembly 18' is permanently attached to coupling part 1', rather than floating within the coupling device. Yet, both of the embodiments create a fluid tight connection throughout the coupling device before allowing any fluid to pass therethrough.

A further embodiment of the present invention will now be described in detail with reference to FIGS. 5A, 5B, 6 and 7. The embodiment is directed to a quick connect fluid coupling device of the type adaptable for supplying fluid from a pressurized source to an output conduit without leakage of the fluid.

Figure 5A:
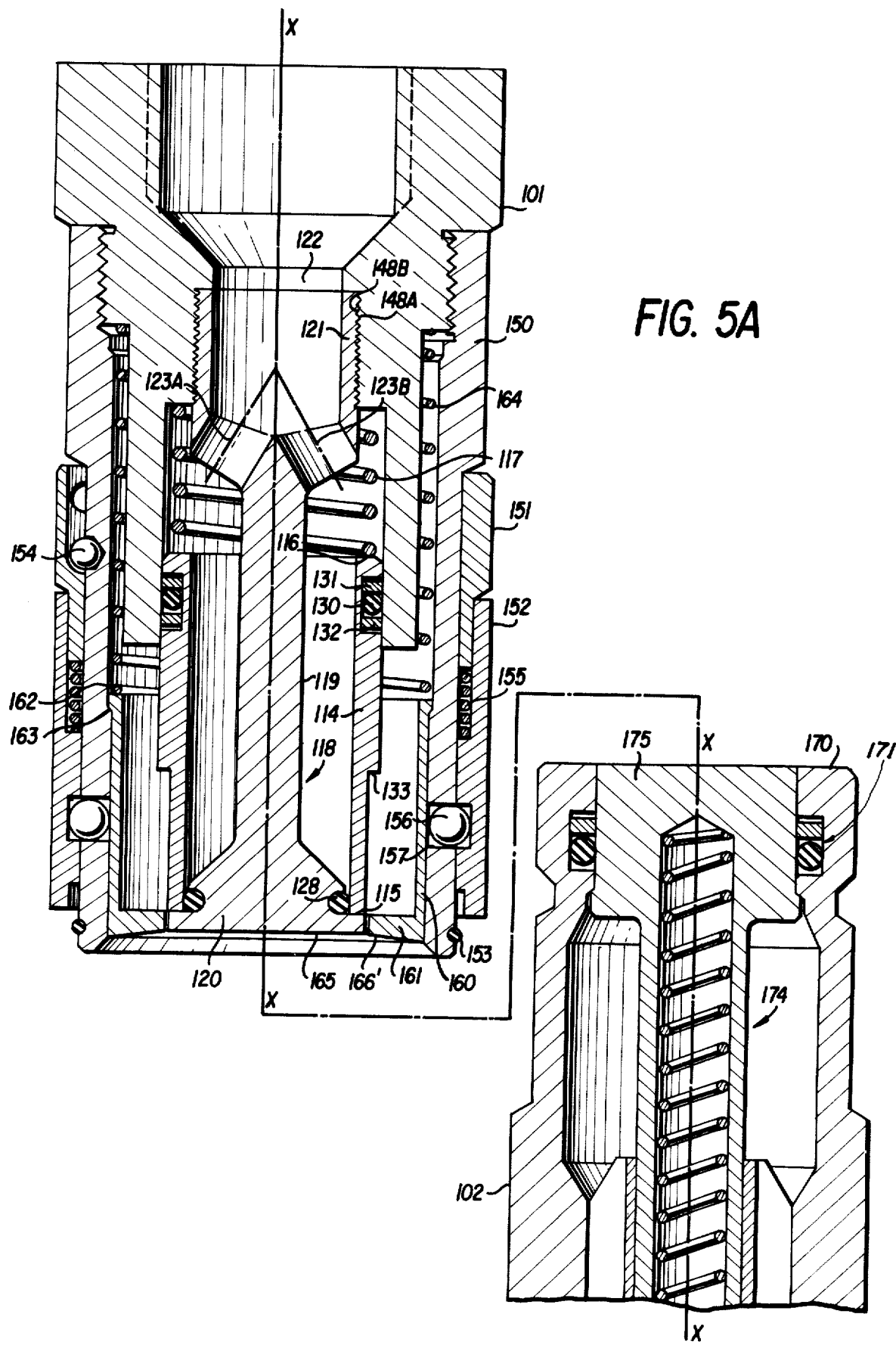
FIG. 5A is a cross-section taken in an axial direction through a pair of coupling parts forming a further embodiment of the present invention, wherein the coupling parts are shown in the disengaged position.
Figure 5B:
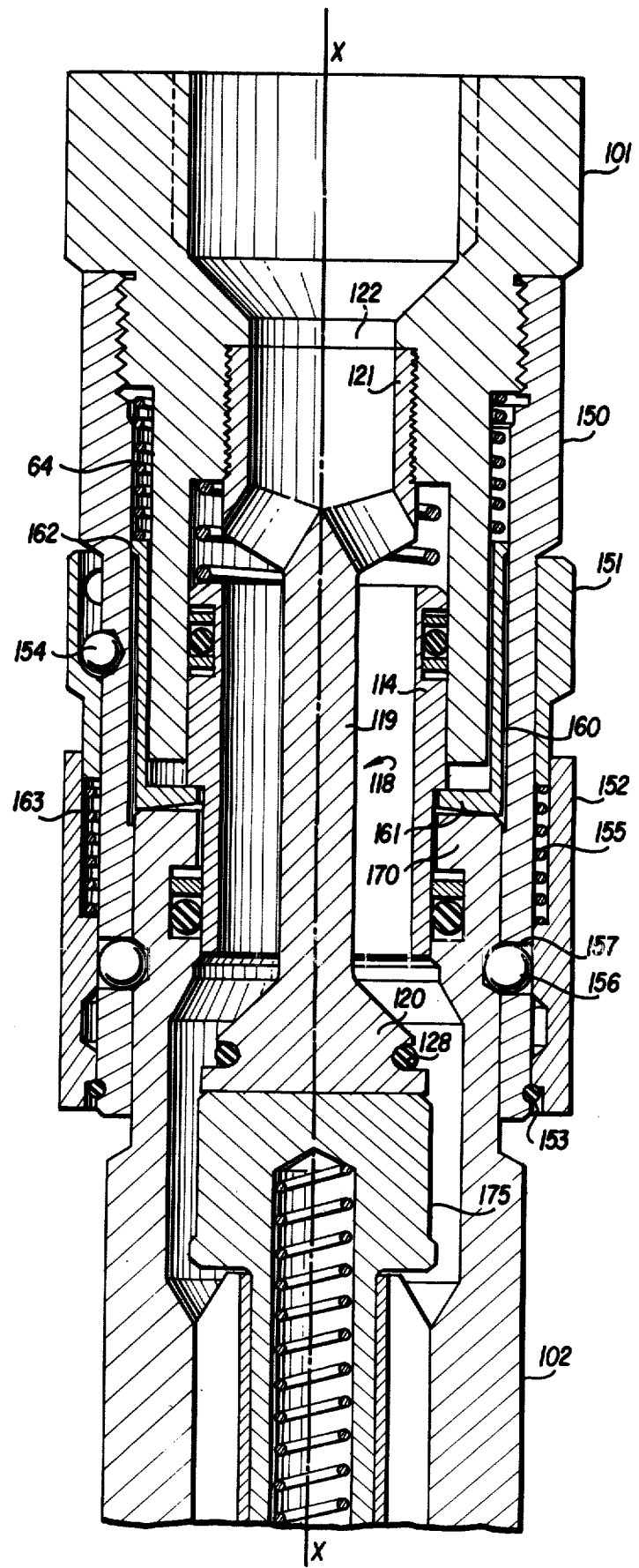
FIG. 5B is a view of the embodiment of FIG. 5A with the coupling parts in the engaged position.

The coupling device as shown in FIGS. 5A and 5B includes a pair of coupling parts 101 and 102, respectively. Each of the coupling parts includes a fluid flow passageway extending in a substantially axial direction completely therethrough. Because coupling part 102 is substantially similar in configuration to the coupling part 2' described in the embodiment of FIG. 4A, a detailed description of coupling part 102 has not been included for purposes of simplicity. It is noted that coupling part 101 includes a hollow, substantially cylindrical configuration with a plurality of threads 148A formed on an interior surface portion of coupling part 101 for a reason which will become clear.

A hollow casing 150 surrounds and is threadidly attached to an exterior surface portion of coupling part 101. Hollow casing 150 slidably supports a pair of hollow stop casings 151 and 152, with a locking ring 153 mounted in a groove formed in an end portion of casing 150 to limit the movement of casing 152 in a direction axially away from coupling part 101. A first set of locking balls 154 are positioned in a groove formed in an exterior surface of casing 150, with balls 154 facing an interior surface of casing 151. Stop casing 151 also includes a groove-shaped depression formed in its interior surface and adaptable for engaging and receiving locking balls 154 upon a specific axial and rotative movement of stop casing 154 against the action of a helically-shaped biasing 155 which extends between axially spaced portions of stop casings 151 and 152. A further set of locking balls 156 are retained in a circumferentially extending slot formed through casing 150 with balls 156 confronting a circumferentially extending groove 157 formed in an interior surface portion of stop casing 152. Locking balls 154 and 156 selectively prevent sliding movement of the casings 151 and 152 relative to fixed casing 150 to lock coupling parts 101 and 102 into a connected position against unintentional disconnection.

A valve assembly 118 is fixedly positioned within coupling part 101 to control the flow of fluid therethrough. Valve assembly 118 includes an elongated shaft portion 119 extending between and attached at one end portion to an enlarged head portion 120 and attached at an opposite end portion to a hollow flow distributor casing 121. A plurality of threads 148B are formed in an exterior surface portion of flow distributor casing 121 for engaging the threaded portion 148A of coupling part 101. Flow distributor casing 121 is formed with a single inlet opening 122 facing away from shaft portion 119 and a plurality of circumferentially spaced outlet openings 123A and 123B arranged about the periphery of and generally facing shaft portion 119. During operation, fluid perferably flows into valve assembly 118 through inlet opening 122, passes through flow distributor casing 121 and then flows through outlet openings 123A and 123B. It is considered within the scope of the present invention to have fluid flow in the opposite direction through valve assembly 118.

While only a pair of outlet openings 123A and 123B are shown in FIG. 5A, the actual number of outlet openings is considered a design choice depending on the type and pressure of fluid transported through the coupling device. Preferably, four outlet openings are employed, wherein the outlets are each designed to form an acute angle α relative to a line extending perpendicular to the symmetrical axis X—X passing through coupling parts 101 and 102. The acute angle α is chosen to come within the range of 15° to 65° and, preferably an angle of substantially 30° is employed to create optional fluid flow, similar to the structure shown in FIG. 2.

Figure 6:
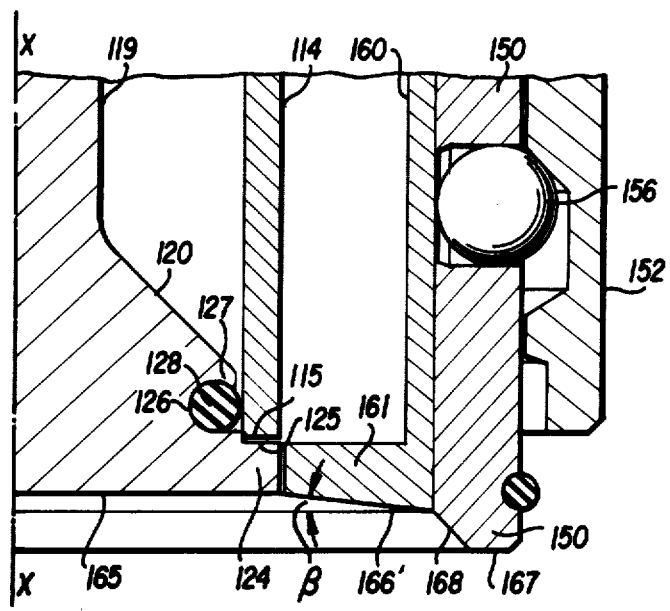
FIG. 6 shows an enlarged front end view of the coupling device of FIG. 5A.

The enlarged end portion 120 of valve assembly 118 is substantially concentrically spaced from an inner wall portion of casing 150. As best shown in FIG. 6, enlarged end portion 120 is formed with a radially extending, disk-shaped flange portion 124 extending toward casing 150. The disk-shaped flange portion 124 is formed with a substantially planar, radially extending side surface 125 which faces toward flow distributor casing 121. Enlarged end portion 120 further includes a circumferentially extending groove or recess 126 formed in a surface located adjacent to planar surface 125, with groove 126 facing toward hollow casing 150. A circumferentially extending protuberance 127 is formed in a side wall portion of groove 126 oppositely spaced from planar surface 125. Protuberance 127 has a lip-shaped configuration and is capable of being bent or folded toward groove 126 for retaining a sealing ring 128 positioned within groove 126, wherein sealing ring 128 consists of a standard O-shaped member formed of a material such as Nitril or Viton.

A hollow inner casing 114 is slidably positioned between an inner wall of coupling part 101 and valve assembly 118. Inner casing 114 has a substantially cylindrical configuration and includes a planar first end surface 115 which extends in a substantially radial direction and which is similar in shape to and substantially confronts the planar side surface 125 of valve assembly 118. Inner casing 114 includes an opposite end surface 116 which faces and is axially spaced from an interior surface portion of coupling part 101. A helically-shaped biasing spring 117 is arranged within coupling part 101 with one end of spring 117 engaging end surface 116 of casing 114 and an opposite end of spring 117 engaging coupling part 101. Spring 117 functions to bias inner casing 114 in the general direction of the enlarged end portion 120 of valve assembly 118. An exterior surface portion of inner casing 114 slidingly contacts an interior surface of coupling part 101, causing casing 114 to move in a direction parallel to center line X—X under the influence of biasing spring 117. A circumferentially shaped opening is formed in the exterior surface portion of casing 114 for receiving a sealing ring member 130 which is compressed between confronting surfaces of inner casing 114 and coupling part 101. A pair of packing members 131 and 132 may also be positioned on either side of sealing member 130 within the opening formed in casing 114 for ensuring a fluid-tight engagement between casing 114 and coupling part 101. For reasons which will become clear, inner casing 114 is formed with an intermediately positioned, radially extending wall portion 133 which is substantially planar in configuration.

When assembled within coupling part 101, inner casing 114 is biased by spring 117 such that end surface 115 abuts against the planar surface 125 of valve assembly 118. Contact between surfaces 115 of casing 114 and 125 of valve assembly provides a positive limit on the axial movement of casing 114 within coupling part 101. Furthermore, when pressed against surface 125 of valve assembly 118, inner casing 114 functions to positively prevent fluid from flowing past the enlarged end portion 120 of valve assembly 118. If it is assumed that inlet opening 122 of valve assembly 118 is in fluid communication with a pressurized source of fluid, it becomes clear that such a fluid will completely fill a chamber formed by inner casing 114 and valve assembly 118. The pressurized fluid acts directly against end surface 116 of inner casing 114 to press casing 114 into even tighter contact with the enlarged portion 120 of valve assembly 118. Furthermore, the pressurized fluid also tends to contact and deform sealing ring 128 into fluid tight engagement with confronting surface portions of inner casing 114 and groove 126. Protuberance 127 when bent toward an opposite side of groove 126 functions to further retain sealing ring 128 within groove 126.

An inner corner of end surface 115 may be selectively bevelled to allow for easy engagement with a corner portion of valve assembly 118 formed by side wall surface 125 and an edge surface of groove 126. In a like manner, an outer edge portion of surface 116 of casing 114 may also be slightly bevelled as shown in FIGS. 5A and 5B, respectively.

A further, hollow outer casing 160 of substantially cylindrical configuration is slidably positioned between casing 150 and inner casing 114. Outer casing 160 includes a disk-shaped flange portion 161 attached to an end thereof, with disk-shaped flange 161 extending in a substantially inward radial direction toward end portion 124 of valve assembly 118. In a preferred embodiment, a cylindrically shaped opening having a thickness of between 0.1 and 0.5 mm is formed between confronting flange portions of outer casing 160 and valve assembly 118. Outer casing 160 includes an opposite end portion 162 of enlarged outer diameter which is adaptable for sliding within a portion of casing 150. Casing 150 includes an intermediate stop surface 163 extending in a generally radially inward direction which is adaptable for engaging the enlarged diameter portion 162 of outer casing 160 to limit the axial movement of casing 160 in the direction away from coupling part 101. Finally, a helically-shaped biasing spring 164 is positioned between the enlarged diameter end portion 162 of outer casing 160 and a further interior wall of coupling part 101 for biasing casing 160 into a position wherein enlarged diameter end portion 162 engages stop surface 163. When such a position is achieved, the disk-shaped flange portion 161 of casing 160 will be substantially concentrically aligned with the end portion 124 of valve assembly 118.

Figure 7:
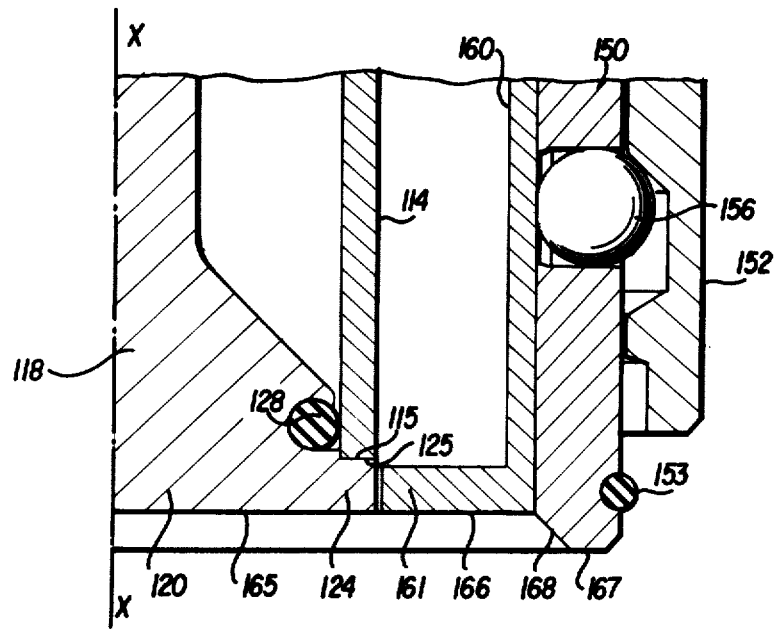
FIG. 7 shows an alternative enlarged front end view of the embodiment of FIG. 5A.

In the construction of FIG. 7, flange portion 161 and valve assembly 118 are each formed with radially extending, substantially planar end surfaces designated 165 and 166, respectively. It is further noted in FIG. 7, that planar end surfaces 165 and 166 lie substantially within a common plane taken in a perpendicular direction to the axis of symmetry X—X. Furthermore, the common plane is axially recessed from an end wall 167 of casing 150, with casing 150 having a bevelled surface 168 extending at an angle of substantially 45° between end wall 167 and an inner side of casing 150 abutting the flange portion 161 of casing 160.

In a modified embodiment shown in FIG. 6, the outer surface 166' of flange portion 161, is, itself, bevelled at an angle $\beta$ of between 0° and 15° toward coupling part 101 over the radial length thereof as compared to a plane extending in a perpendicular direction through center line X—X. Preferably, surface 166' is bevelled toward coupling part 101 at an angle of substantially 5° to provide for easy engagement with coupling part 102.

Hollow coupling part 102 has a substantially cylindrical configuration including a flat end portion 170 adaptable for pressing into abutment with surface portion 166' of flange 161 as coupling parts 101 and 102 are moved into engagement with one another. Further relative movement of the coupling parts 101 and 102 forces an inner surface of flange end portion 161 into abutment with the intermediately positioned, radially extending wall portion 133 of inner casing 114. Yet further relative pressure on coupling parts 101 and 102 functions to press both outer casing 160 and inner casing 114 toward coupling part 101, compressing biasing springs 117 and 164, respectively, until the fully engaged position of FIG. 5B is reached.

Coupling part 102 includes a circumferentially extending groove formed on an inner surface of flat end portion 170 which supports a sealing assembly 171 that comprises a sealing ring and one or more associated packing rings. As flat end portion 170 is inserted into coupling part 101, sealing assembly 171 engages and forms a fluid-tight connection with an exterior surface portion of inner casing 114.

A further valve assembly 174 is concentrically arranged within coupling part 102, with valve assembly 174 including an enlarged head portion 175 adaptable for abutting the enlarged end portion 120 of valve assembly 118. Valve assembly 174 is formed as an elongated body including a plurality of circumferentially spaced splines which are alternately positioned between pairs of similarly-shaped splines circumferentially spaced about an interior portion of coupling part 102. A fluid passageway is formed through coupling part 102 which extends around enlarged head portion 175 and between pairs of the confronting spline members.

In the embodiment of FIGS. 5A and 5B, fluid is caused to flow around the solid, elongated valve shaft 119 as compared to the internal flow through the hollow valve assembly described in the embodiment of FIGS. 4A and 4B. Furthermore, the movement of inner casing 114 is positively limited by contact with surface portion 125 of valve assembly 118. This ensures that a fluid-tight seal is created between inner casing 114 and valve assembly 118 due to the fluid actually pressing casing 114 into even tighter contact with valve assembly 118. In addition, the pressurized fluid present within disconnected coupling part 101 provides a pressure which directly presses against an upper surface of sealing ring 128 and serves to force sealing ring 128 to remain within groove 126 while providing a fluid-tight seal between valve assembly 118 and inner casing 114.

The invention is not restricted to the preceeding embodiments, but may be subjected to modifications within the scope of the following patent claims.

What I claim is:

1. A coupling device for supplying fluid from a pressurized source to an output conduit without fluid leakage, said coupling device comprising:

a first coupling part having a flow passageway extending therethrough;

a second coupling part having a further flow passageway extending therethrough, said flow passageways forming a continuous flow passageway through said coupling device as said coupling parts are detachably coupled to one another to permit fluid flow through said coupling device;

a first valve body extending within said first coupling part in a direction parallel to a longitudinal axis through said first coupling part, said first valve body being fixedly attached to said first coupling part and including a first, enlarged end portion formed thereon;

a second valve body slidably disposed within said second coupling part and including a second end portion contacting said first, enlarged end portion as said first and second coupling parts are detachably coupled to one another;

a hollow casing slidably arranged within said first coupling part so as to selectively surround portions of said first valve body, said hollow casing including a cylindrically-shaped surface portion perpendicularly spaced from said longitudinal axis a distance which is less than a perpendicular distance between a side surface of a flange mounted on said first, enlarged end portion and said longitudinal axis, providing for selective contact between said hollow casing and said side surface of said flange to block fluid flow completely through said first coupling part;

said hollow casing further including an outer surface having a raised surface portion extending in a radially outwardly direction toward a surrounding portion of said first coupling part, with biasing means positioned between an interior portion of said first coupling part and a portion of said hollow casing for biasing said hollow casing into surface contact with said side surface of said flange;

said coupling device further including a cover assembly slidably disposed within said first coupling part and encircling said casing, said cover assembly including an elongated flange extending in a radially inwardly direction from a first end of said cover surrounding said first, enlarged end portion, said cover assembly further including a second end axially spaced from said first, enlarged end portion; said elongated flange having an inner end surface spaced from said longitudinal axis a perpendicular distance less than a perpendicular distance between said raised surface portion and said longitudinal axis, said elongated flange further including a first side wall portion facing said raised surface portion and extending in a direction substantially perpendicular to said longitudinal axis and said elongated flange including a second side wall surface facing away from said raised surface and inclined toward said first side surface as the distance towards said inner end surface decreases; and said coupling device includes further biasing means extending between an interior wall portion of said first coupling part and said second end of said cover member for biasing said elongated flange into a position radially aligned with said flange mounted on said first, enlarged end portion;

whereby said second coupling part contacts and presses said elongated flange toward said further biasing means as said coupling parts are detachably coupled to one another, with said elongated flange contacting said raised surface portion of said hollow casing to slide said hollow casing out of contact with said first, enlarged end portion to allow fluid flow through said first coupling part.

2. A coupling device according to claim 1, wherein said first coupling part includes sealing means for providing a fluid-tight seal between portions of said hollow casing and said first valve body.

3. A coupling device according to claim 2, wherein said sealing means comprises a substantially circumferentially extending groove formed in a surface of said first, enlarged end portion of said first valve body, with said circumferentially extending groove facing in a radially outwardly direction toward an inner wall portion of said hollow casing extending in a direction parallel to the longitudinal axis through said first coupling part, said sealing means further including a substantially ring-shaped sealing member formed of deformable material mounted within said groove and including a surface portion deformably engaging said inner wall portion of said hollow casing to form a fluid-tight seal therebetween.

4. A coupling device according to claim 3, wherein said enlarged end portion of said first valve member further includes a radially outwardly extending protuberance of circumferential configuration positioned adjacent to and on an opposite side of said groove from said radially extending flange formed on said enlarged end portion for engaging said hollow casing.

5. A coupling device according to claim 4, wherein said radially outwardly extending protuberance partially overlaps said groove to bias said resilient sealing member into engagement with said groove.

6. A coupling device according to claim 1, wherein said biasing means comprises a helical spring assembly having a first end portion engaging an interior surface portion of said first coupling part and having a second, opposite end portion engaging an end surface of said hollow casing.

7. A coupling device according to claim 1, wherein said biasing means comprises a quantity of pressurized fluid located within said first coupling part, said fluid engaging an end surface of said hollow casing to press said casing into contact with said flange extending outwardly from said enlarged end portion of said first valve body.

8. A coupling device according to claim 1, wherein said first valve body includes an elongated intermediate portion attached to a hollow, flow distributor casing, with said hollow flow distributor casing including at least one inlet and one outlet extending through opposite wall surfaces to form a flow passageway therethrough.

9. A coupling device according to claim 8, wherein said hollow, flow distributor casing includes a plurality of separate outlets formed through a wall surface confronting said elongated intermediate portion of said first valve body, with said plurality of separate outlets circumferentially spaced from one another.

10. A coupling device according to claim 8, wherein an outer surface of said hollow, flow distributor casing includes a plurality of threads adaptable for engagement with a plurality of similarly-shaped threads formed on a confronting inner surface of said first coupling part for fixedly attaching said first valve body to said first coupling part.

11. A coupling device according to claim 1, wherein said second coupling part supports a substantially ring-shaped sealing member which effects sealing contact with an exterior surface portion of said hollow casing prior to said second coupling part moving said casing, thereby forming a fluid-tight seal between said second coupling part and said casing before said fluid passageway is completed completely through said coupling device.

12. A coupling device according to claim 1, wherein said casing assembly comprises a hollow casing including first and second portions each having a smoothly-shaped interior surface of cylindrical configuration and each having a smoothly-shaped exterior surface of cylindrical configuration, wherein said first portion is positioned adjacent to to said biasing means and has an outer diameter greater than the second portion integrally attached thereto, with said raised surface portion formed on said hollow casing dividing said first and second cylindrically-shaped portions from each other.

13. A coupling device for supplying fluid from a pressurized source to an output conduit without leakage, said coupling device comprising:

a first coupling part having a flow passageway extending therethrough;

a second coupling part having a further flow passageway extending therethrough, with said flow passageways forming a continuous flow passageway through said coupling device as said first and second coupling parts are detachably coupled to one another;

a first valve body extending within said first coupling part in a direction substantially parallel to a longitudinal axis through said first coupling part, said first valve body fixedly engaging said first coupling part and including a first enlarged end portion formed thereon;

a second valve body arranged within said second coupling for sliding movement parallel to a longitudinal axis through said second coupling part and including a second end portion selectively engaging said first, enlarged end portion as said coupling parts are detachably coupled to one another;

said coupling device further comprising a hollow casing slidably disposed within said first coupling part so as to selectively surround portions of said first valve body; said hollow casing including a cylindrically-shaped inner surface portion extending parallel to said longitudinal axis and spaced from said first valve body, said hollow casing further including an end surface extending perpendicular to said longitudinal axis and joining said cylindrically-shaped inner surface portion;

said coupling device further comprising a cover assembly slidably arranged within said first coupling part and positioned between said hollow casing and an interior surface of said first coupling part, said cover assembly including an elongated flange extending in a radially inwardly direction from a first end of said cover assembly surrounding the first enlarged end portion of said first coupling part, said cover assembly further including a second end axially spaced from the first enlarged end portion of said first coupling part;

said coupling device further comprising sealing means for providing a fluid-tight seal between said first valve body and said hollow casing to prevent fluid from flowing through said first coupling part when detached from said second coupling part;

said sealing means comprising a flange circumferentially surrounding and projecting outwardly from said first, enlarged end portion of said first coupling part, said flange having a side surface extending perpendicular to said longitudinal axis a distance sufficient to intersect a projected path of travel of said end surface of said hollow casing;

said sealing means further comprising a deformable sealing ring mounted in a circumferentially disposed groove formed in an outer surface of said first, enlarged end portion, said deformable sealing ring including a portion extending beyond said groove a distance sufficient to intersect said projected path of travel of said cylindrically-shaped inner surface portion of said hollow casing; and said sealing means further comprising resilient biasing means extending between an interior wall portion of said first coupling part and a portion of said hollow casing for biasing said perpendicular end surface of said hollow casing into surface contact with said perpendicularly extending side wall while biasing said cylindrically-shaped inner surface into fluid-tight contact with said deformable sealing ring so as to block the flow of fluid between said hollow casing and said first valve body.

14. A coupling device according to claim 13, wherein said elongated flange portion includes a circumferentially extending inner end surface confronting and spaced from a circumferentially extending end surface of said flange extending outwardly from said enlarged end portion of the first valve body, wherein said confronting circumferentially extending end surfaces are spaced from one another a distance of between 0.1 mm and 0.5 mm.

15. A coupling device according to claim 13, wherein resilient biasing means is positioned between an interior wall portion of said first coupling part and said second end of said cover assembly for biasing said cover to a position wherein said elongated flange is radially aligned with said first, enlarged end portion.

16. A coupling device according to claim 13, wherein said hollow casing further includes a raised surface portion extending in a radially outwardly direction toward said first coupling part.

17. A coupling device according to claim 16, wherein said elongated flange portion includes opposite side wall portions extending substantially parallel to one another with each side wall extending in a direction perpendicular to said longitudinal axis through said first coupling part.

18. A coupling device according to claim 16, wherein said elongated flange portion includes a first side wall portion facing said raised surface portion and extending in a direction substantially perpendicular to said longitudinal axis through said first coupling part, said elongated flange portion further includes a second, opposite side wall portion facing said second coupling part and inclined toward said first side wall portion as the distance between said elongated flange and said longitudinal axis decreases.

19. A coupling device according to claim 18, wherein said second side wall portion of said elongated flange is inclined at an angle of between 0°–15° toward said radially extending first side wall portion.

20. A coupling device according to claim 13, wherein said perpendicularly extending side surface of said flange joins an axially extending outer surface portion of said first, enlarged end portion to form a right angled corner engaging a corner of said hollow casing formed by adjacent portions of said end surface and said inner surface extending perpendicular to one another.

21. A coupling device according to claim 13, wherein said elongated flange extending in a radially inwardly direction from said cover assembly initially forms a gap of between 0.1 mm and 0.5 mm with a confronting end surface of said flange projecting outwardly from said first, enlarged end portion of said first coupling part to prevent dirt, grease and the like from entering the first coupling part prior to attachment with said second coupling part.

* * * * *